US011616937B2

(12) United States Patent
Modrzyk et al.

(10) Patent No.: US 11,616,937 B2
(45) Date of Patent: Mar. 28, 2023

(54) MEDIA PROCESSING SYSTEMS

(71) Applicant: Arm Limited, Cambridge (GB)

(72) Inventors: Damian Piotr Modrzyk, Katowice (PL); Viacheslav Chesnokov, Loughborough (GB); Sven Ola Johannes Hugosson, Lund (SE); Alex Kornienko, Loughborough (GB); Guney Kayim, Nottingham (GB); Ertunc Erdil, Loughborough (GB); Dominic Hugo Symes, Cambridge (GB); Brian Paul Starkey, Cambridge (GB); Michal Karol Bogusz, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/410,560

(22) Filed: May 13, 2019

(65) Prior Publication Data
US 2019/0349558 A1   Nov. 14, 2019

(30) Foreign Application Priority Data

May 14, 2018  (GB) ..................................... 1807782

(51) Int. Cl.
*H04N 9/87*         (2006.01)
*G06F 3/06*         (2006.01)
(Continued)

(52) U.S. Cl.
CPC ............. *H04N 9/87* (2013.01); *G06F 3/0604* (2013.01); *G06F 3/0659* (2013.01);
(Continued)

(58) Field of Classification Search
CPC .......... H04N 9/87; H04N 19/14; H04N 5/147; H04N 9/646; G06F 3/0604; G06F 3/0659;
(Continued)

(56) References Cited

U.S. PATENT DOCUMENTS

| 2010/0111489 A1* | 5/2010 | Presler ................... H04N 5/232 |
| | | 386/278 |
| 2010/0309987 A1* | 12/2010 | Concion ................ H04N 5/772 |
| | | 375/240.26 |

(Continued)

FOREIGN PATENT DOCUMENTS

| EP | 1317143 | 6/2003 |
| EP | 3086562 | 10/2016 |

(Continued)

OTHER PUBLICATIONS

GB Combined Search and Examination Report dated Nov. 7, 2018, GB Patent Application GB1807782.6.

(Continued)

*Primary Examiner* — Sunghyoun Park
(74) *Attorney, Agent, or Firm* — Vierra Magen Marcus LLP

(57) ABSTRACT

When a producer processing unit, such as a video decoder, of a media processing system is producing a data output for use by a consumer processing unit, such as a display processor, the producer processing unit also generates metadata for the data output that it is producing and provides that metadata for use by the consumer processing unit. The consumer processing unit then uses the metadata provided by the producer processing unit when processing the data output to which the metadata relates.

17 Claims, 5 Drawing Sheets

(51) Int. Cl.
    *G06T 5/00*      (2006.01)
    *H04N 9/64*      (2023.01)
    *G06T 3/40*      (2006.01)
    *H04N 19/14*     (2014.01)
    *H04N 5/14*      (2006.01)

(52) U.S. Cl.
    CPC .............. *G06F 3/0673* (2013.01); *G06T 3/40* (2013.01); *G06T 5/009* (2013.01); *H04N 5/147* (2013.01); *H04N 9/646* (2013.01); *H04N 19/14* (2014.11); *G06T 2207/10016* (2013.01)

(58) Field of Classification Search
    CPC ......... G06F 3/0673; G06T 3/40; G06T 5/009; G06T 2207/10016
    See application file for complete search history.

(56)                References Cited

U.S. PATENT DOCUMENTS

2012/0147265 A1*   6/2012  Gu .................... H04N 21/472
                                                        348/E7.001
    2013/0222640 A1*   8/2013  Baek ................ H04N 5/232933
                                                        348/231.99
    2013/0290859 A1   10/2013  Venkitaraman et al.
    2015/0269236 A1    9/2015  Rosen et al.
    2016/0014133 A1    1/2016  Kanga et al.
    2016/0212433 A1*   7/2016  Zhu ...................... H04N 19/182
    2017/0076433 A1*   3/2017  Hellier .................... H04N 1/58
    2017/0085895 A1*   3/2017  Gu .......................... H04N 19/46
    2017/0124048 A1*   5/2017  Campbell ............... G06F 40/18
    2017/0278545 A1*   9/2017  Woodward, Jr. ....... G11B 27/10

FOREIGN PATENT DOCUMENTS

WO      WO2007/026998      3/2007
    WO         2012/033758     3/2012
    WO      WO2016/200542      12/2016

OTHER PUBLICATIONS

Examination Report dated Aug. 19, 2021, GB Patent Application GB1807782.6.
Examination Report dated Jun. 27, 2022, GB Patent Application No. GB1807782.6.

* cited by examiner

MEDIA PROCESSING SYSTEMS

BACKGROUND

The technology described herein relates to media processing systems, in particular to the generation and use of metadata in media processing systems.

In a media processing system, a "producer" processing unit may produce (generate) a data output, such as a frame (image), that is then to be used (e.g. processed) by one or more other "consumer" processing units of the media processing system. For example, a video decoder may decode encoded video data representing a sequence of video frames to be displayed, with a display processor then processing the video frames in the desired manner, before providing the processed video frames to a display for display.

FIG. 1 shows schematically an exemplary media (data) processing system which includes a multi-media subsystem. As shown in FIG. 1, the processing system 200 comprises a multi-media subsystem in the form of a system on-chip (SoC) 202. The system generally also comprises off-chip (main) memory 216, a display device 218 and a camera 220. The multi-media subsystem (SoC) 202 comprises a central processing unit (CPU) 204, a graphics processing unit (GPU) 206, a video processor (VPU) 208, a display processor (DPU) 210, an image signal processor (ISP) 222, an interconnect 212 and a memory controller 214.

As shown in FIG. 1, the CPU 204, GPU 206, video processor 208, display processor 210 and ISP 222 communicate with each other via the interconnect 212 and with the memory 216 via the interconnect 212 and a memory controller 214. The display processor 210 also communicates with the display device 218. The camera 220 communicates with the multi-media system SoC 202 via the ISP 222.

In a media processing system as shown in FIG. 1, the video processor 208 may, for example, be operable to decode encoded video data that has been stored in the memory 216, and to then store the decoded video data in the memory 216 for subsequent processing by, for example, the display processor 210 for providing to the display device 218 for display. In this case therefore, the video processor 208 will be acting as a producer processor unit producing, e.g., frames of decoded video data for consumption by the display processor 210.

Correspondingly, the ISP 222 may generate a sequence of images (frames) from the camera 220 and store them in the memory 216, with the video processor 208 then encoding that sequence of frames to provide encoded video data, e.g., for storage or transmission. In this case therefore, the ISP 222 will be acting as a producer processing unit producing frames for consumption by the video processor 208.

In arrangements such as that illustrated in FIG. 1, a "producer" processing unit will typically store the data that it is producing in appropriate memory that is shared with (also accessible to) the consumer processing unit or units that are to use the data, with the consumer processing unit or units then reading the data from the memory for use.

The Applicants believe that there remains scope for improved handling of data outputs that are being shared between producing and consuming processor units in media processing systems.

BRIEF DESCRIPTION OF THE DRAWINGS

Various embodiments of the technology described herein will now be described by way of example only and with reference to the accompanying drawings, in which.

Like reference numerals are used for like features in the drawings (where appropriate).

DETAILED DESCRIPTION

Figure 1:
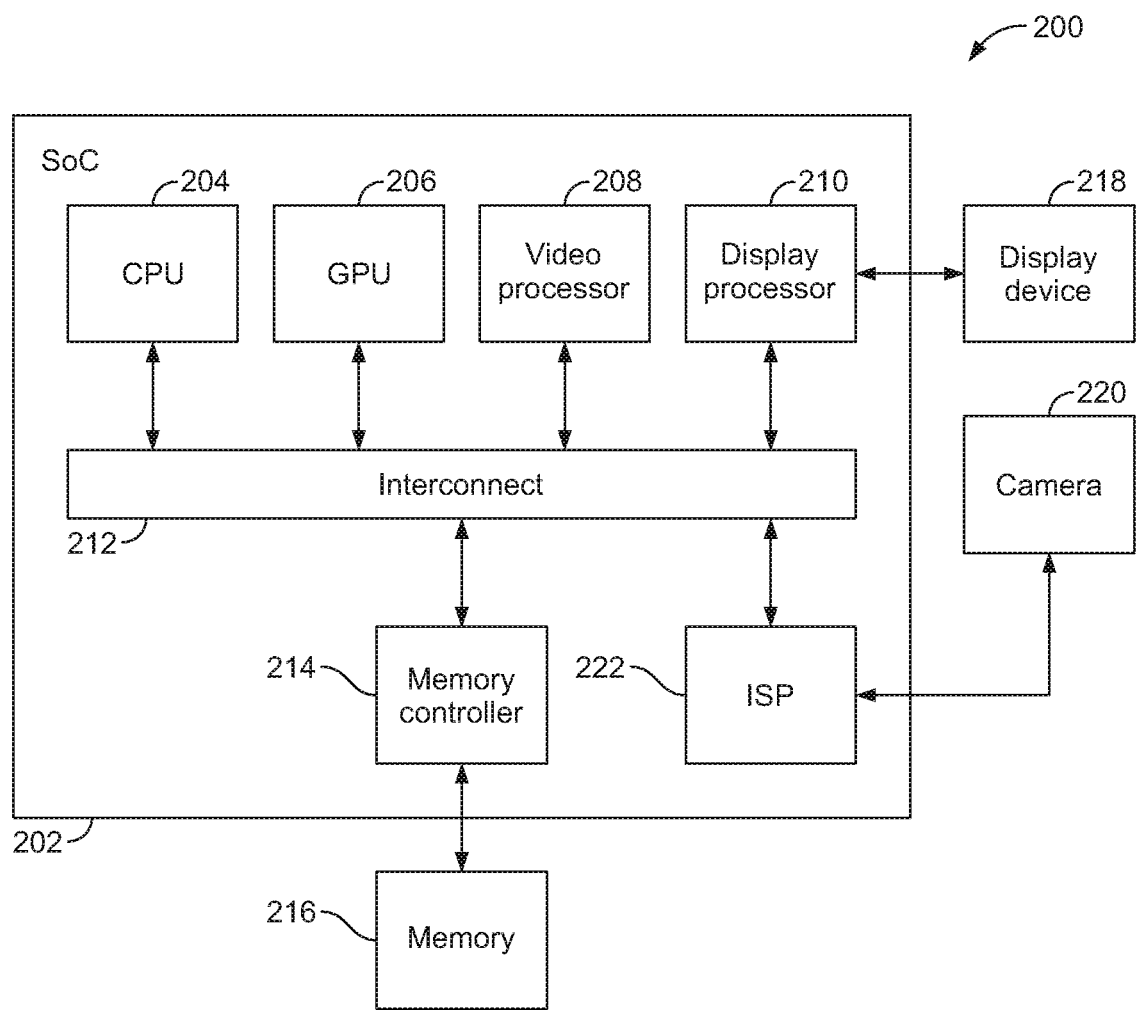
FIG. 1 shows an exemplary media processing system.

An embodiment of the technology described herein comprises a method of operating a media processing system that comprises:
one or more producer processing units operable to produce data outputs;
one or more consumer processing units operable to use a data output produced by a producer processing unit; and
a memory for storing data outputs produced by the producer processing unit or units;
the method comprising:
  a producer processing unit of the one or more producer processing units producing a data output and storing the data output in the memory; and
  one or more of the one or more consumer processing units reading the data output from the memory and processing the read data output; the method further comprising:
  the producer processing unit:
    also generating metadata for the data output that it is producing and storing in the memory; and
    providing that metadata for use by a consumer processing unit that is reading the data output from the memory; and
  a consumer processing unit that is reading the data output from the memory and processing the read data output:
    using the metadata for the data output generated and provided by the producer processing unit when processing the data output to which the metadata relates.

An embodiment of the technology described herein comprises a media processing system comprising:
a producer processing unit operable to produce data outputs;
one or more consumer processing units operable to use a data output produced by the producer processing unit; and
a memory for storing data outputs produced by the producer processing unit;
wherein:
  the producer processing unit is operable to, when producing a data output for use by a consumer processing unit or units and storing the data output in the memory:
    also generate metadata for the data output that it is producing and storing in the memory; and
    provide that metadata for use by a consumer processing unit that is reading the data output from the memory; and
  at least one of the one or more consumer processing units is operable to, when it is reading a data output produced by the producer processing unit from the memory and processing the read data output:

use metadata for the data output generated and provided by the producer processing unit when processing the data output to which the metadata relates.

The technology described herein relates to situations in which a producer processing unit of a media processing system is producing a data output that is to be used by one or more other consumer processing units of the media processing system.

In the technology described herein, a producer processing unit, as well as producing the data output that is to be used by a consumer processing unit or units, also produces metadata for the data output, and provides that metadata for use by the consumer processing unit or units. The consumer processing unit or units correspondingly use the metadata provided for the data output when processing the data output.

As will be discussed further below, this can provide an improved and more efficient arrangement for providing and using metadata to control embodiments of the processing of data outputs in media processing systems. For example, there can be a number of situations in which information (i.e. metadata) about a data output being processed can be usefully used in a media processing system to improve the processing of the data output, e.g. to provide enhanced display quality, for example.

The technology described herein facilitates the provision of metadata to assist consumer processing units to improve their processing of data outputs in a media processing system, by having a producer processing unit generate and provide metadata that a consumer processing unit can then use when processing a data output. This then reduces or avoids, for example, the need for the consumer processing unit itself to generate any metadata for a data output that it is processing.

Furthermore, in the technology described herein, as the metadata is generated and provided by the producer processing unit, a consumer processing unit can use that metadata in relation to the data output from which the metadata was generated (in contrast, e.g., to arrangements in which a data output may be analysed by a consumer processing unit to produce metadata that is then used to control the processing of later data outputs).

The Applicants have recognised in this regard that, particularly in media processing systems, it can be the case that data outputs in a sequence of data outputs (e.g. frames for display) can vary quite significantly from one another, such that, for example, metadata generated from one data output in the sequence, may not be so applicable to a later data output or outputs in the sequence. The technology described herein avoids this, by providing to consumer processing units metadata for the frame that they are actually processing (i.e. such that the metadata can be (and is) used to control the processing of the data output from which the metadata itself was generated (i.e. a data output is processed using metadata generated from that data output itself, and not simply from metadata generated from a different data output)).

The technology described herein can be used in any desired and suitable media processing system in which a "producing" processing unit will generate and store data outputs for use by one or more "consuming" processing units. Examples of media processing systems to which the technology described herein is particularly applicable include video processing systems, image processing systems, and graphics processing systems.

A (and each) producer processing unit correspondingly can be any suitable and desired processing unit of a media processing system that may produce a data output for use by one or more other processing units of the media processing system. In an embodiment a (and the) producer processing unit is one of: a video processor (e.g. a video encoder and/or video decoder), a graphics processor, an image signal processor (ISP), a digital signal processor (DSP), a display processor (e.g. where the display processor has memory writeback capability), and a central processing unit (CPU) of the media processing system.

There may only be one producer processing unit in the media processing system. However, in an embodiment, there are plural producer processing units. The plural producer processing units may comprise, for example, one or more of, and in an embodiment plural of, and in an embodiment all of: a video processor, a graphics processor, an image signal processor, a digital signal processor, a display processor, and a central processing unit (CPU).

Thus, in an embodiment, the media processing system comprises plural producer processing units, each of which is operable in, and operates in, the manner of the technology described herein.

The technology described herein can be used for all forms of data outputs that a processing unit of a media processing system may provide and/or use. Thus the data output that is being produced by a producer processing unit can comprise any suitable and desired data output that may be used by other processing units of the media processing system. This may depend, for example, upon the nature of the producer processing unit.

The data output that is being produced may, and in an embodiment does, comprise image data, and/or and may correspond to one or more images (frames of image data) (and in an embodiment this is the case). Thus, in an embodiment, the data output comprises an image, and in an embodiment a frame, e.g. for display. Hence, the technology described herein should (and in an embodiment does) produce some useful output data as described herein.

The data output may, for example, and in an embodiment does, represent an array of data elements, each having a respective data value or set of data values, such as a set of colour (e.g. RGB or RGBA, or YUV or YUVA) values, associated with it.

In an embodiment, the data output comprises an image or frame generated by a video processor, a graphics processor or an image signal processor.

A (and each) consumer processing unit can correspondingly be any suitable and desired processing unit of a media processing system that may use a data output produced by a processing unit of the media processing system.

In an embodiment, the (and each) consumer processing unit is one of: a video processor, a graphics processor, an image signal processor, a digital signal processor, a display processor (controller), a central processing unit of the data processing system, and any other hardware accelerator/module operable to process (e.g. dedicated to processing) a, e.g. particular form of, data output, such as a motion vector estimator.

There may only be a single consumer processing unit, but in an embodiment the media processing system includes plural consumer processing units. The plural consumer processing units may comprise, for example, one or more of, and in an embodiment plural of, and in an embodiment all of: a video processor, a graphics processor, an image signal processor, a digital signal processor, a display processor (controller), a central processing unit (CPU), and a (e.g. dedicated) hardware accelerator.

Where the media processing system includes plural consumer processing units, then each consumer processing unit is in an embodiment operable in the manner of the technology described herein.

There may be only one consumer processing unit that is using a data output, or more than one (plural) consumer processing units may use the (same) data output. Where plural consumer processing units are reading and using the same data output, then each of the consumer processing units in an embodiment operates in the manner of the technology described herein.

Correspondingly, in an embodiment, a given consumer processing unit can consume (use) plural data outputs at the same time, e.g. produced by the same or different producer processing units.

It would also be possible for a processor unit to act both as a producer processing unit and as a consumer processing unit, if desired. In this case, the processing unit could act solely as either a producer processing unit or a consumer processing unit at any given time, or it can act as both a producer processing unit for one or more data outputs, and as a consumer processing unit for one or more (e.g. other) data outputs at the same time (simultaneously), if desired.

A consumer processing unit may use and process a data output that is being produced by a producer processing unit in any suitable and desired manner. This may depend, for example, upon the nature of the consumer processing unit and/or the data output in question (e.g. as discussed above).

In an embodiment, the consumer processing unit is a graphics processing unit and performs graphics processing on the data output that it is consuming. In an embodiment, the consumer processing unit is a video processor, and performs video processing (e.g. encoding or decoding) on the data output that it is consuming. In an embodiment, the consumer processing unit is a display processor (a display controller), and performs display processing on the data output that it is consuming, e.g. so as to display the data output on a display. In an embodiment, the consumer processing unit is a hardware accelerator/module for image processing (that accelerates an image processing-related operation), such as an SLAM, and/or VR/AR, accelerator.

In an embodiment, the processing that the consumer processing unit performs on the data output is one or more of: compositing the data output with another data output or outputs; encoding (e.g. compressing) the data output; decoding (e.g. decompressing) the data output; applying one or more of: tone mapping, scaling and image enhancement to the data output; applying a transformation to the data output (e.g. "warping" the data output where the data output is an image); applying a rotation to the data output; and determining tracking positions (e.g. 6 degrees of freedom (DoF) tracking positions) for or from the data output.

The memory in which the data outputs are stored (and from which the data outputs are read) may be any desired and suitable memory of or for the media processing system, such as, and in an embodiment, a main memory for the processing units in question (e.g. where there is a separate memory system for the processing units in question), and/or a main memory of the media (data) processing system that is shared with other elements, such as a host processor (CPU) of the media, and/or overall data, processing system.

The memory may be external to the processing units in question. In an embodiment, the memory is a DRAM, in an embodiment an external DRAM.

A producer processing unit can store its data output in the memory in any suitable and desired manner. This may, e.g., depend upon the nature of the media processing system and the producer processing unit in question. In an embodiment, a (and each) producer processing unit is operable to store its data output in an allocated region of the memory (in a memory "buffer" assigned for the purposes of storing the data output in question). A (and each) consumer processing unit that is to use the data output will then read the data output from the corresponding memory region (buffer).

Other arrangements would, of course, be possible.

The metadata that is generated by the producer processing unit for the data output that it is producing can be any suitable and desired data that provides information about, and/or related to, the data output to which it relates (and for which it is generated).

In one embodiment, the metadata is indicative of a process (e.g. a processing parameter) that has been or is to be applied to/used for the data output, such as an indication of an applied or intended rotation angle, a downscaling ratio to apply/that has been applied (if downscaling is being applied), and/or a compression ratio to apply/that has been applied (if compression is being applied), for the data output. In this case, the metadata may, e.g., be a single value for the data output.

In an embodiment, the metadata is derived from the data output in question.

In an embodiment, the metadata is indicative of a particular characteristic or characteristics (property or properties) of the data output. For example, the metadata may indicate the total value of, and/or minimum and/or maximum values of, and/or an average value of or for, a particular characteristic or property of a data output, or of regions within a data output.

The metadata may also, e.g., be in the form of a histogram representing the particular characteristic or characteristics (property or properties) of the data output, and/or indicate (e.g. as a bitmap), region or regions of a data output having a particular characteristic or property.

Correspondingly, the metadata can be provided at any desired "resolution" for a data output, ranging from, for example, a single value for the entire data output, to plural values, e.g., each being for a respective region of the data output (down to any desired resolution of subdivision of the data output into respective regions). Thus metadata having any desired size can be generated for a (and each) data output, as desired.

The particular characteristic or characteristics (property or properties) that the metadata indicates can be any suitable and desired characteristic or characteristics of the data output.

In an embodiment, the particular characteristic(s) or property(s) that the metadata relates to (and indicates) comprises one or more of: a luminosity measure for the data output; a transparency measure for the data output; domain transformed information for the data output; the data values (e.g., and in an embodiment, the colour values) for the data output; an intensity measure for the data output; noise levels in the data output; gradients in the data output; and edges (edge sharpness) in the data output. The metadata could indicate these characteristics for the data output as a whole, and/or indicate these characteristics for respective regions of the data output, as desired.

The metadata may describe the data output itself (i.e. be indicative of a property or characteristic that is derived from the data output in question alone).

The metadata could also be indicative of changes relative to another, e.g. previous, data output (e.g. of changes between successive data outputs (e.g. frames) being produced by the producer processing unit). In this case, the metadata could, and in an embodiment does, indicate the size of any changes or differences between respective (e.g. successive) data outputs, in an embodiment for respective regions of the data output. This may be useful where, for example, the producer processing unit is producing frames for encoding by a video processor, as it can then allow the video processor to derive information about the complexity of the frame that is to be encoded, so as to thereby select its encoding parameters accordingly.

Thus in an embodiment, the metadata is indicative of whether and/or how the data output for which the metadata is being generated has changed and/or differs from another, different data output (e.g., and in an embodiment, a preceding, and in an embodiment the immediately preceding, data output from the producer processing unit in question).

Thus in an embodiment, the metadata represents and/or is indicative of an absolute characteristic or characteristics (property or properties) of the data output, and/or represents and/or is indicative of a characteristic or characteristics (property or properties) of the data output relative to another data output (i.e. represents or is indicative of changes in the data output to which the metadata relates relative to another (e.g. previous, e.g. immediately preceding, data output from the producer processing unit in question).

In an embodiment, the metadata relates to the luminosity of regions within the data output (i.e. the particular characteristic or property comprises a luminosity measure). In this case, a histogram of the luminosity values for the data output may be generated, and/or minimum and maximum values of luminance for the data output may be determined. This can be used, e.g., to control the brightness of a backlit display screen.

In another embodiment, the metadata relates to the transparency of regions of the data output (i.e. the particular characteristic or property comprises a transparency measure).

In one embodiment, the metadata relates to domain transformed information of the data output, such as frequency domain transform information (i.e. the particular characteristic or property comprises domain transformed information). The metadata may, for example, comprise a histogram of frequency data.

In another embodiment, the metadata relates to data values (e.g. colour values) within the data output (i.e. the particular characteristic or property comprises the data values themselves, e.g. colour). In this case, the metadata may comprise the average, e.g. colour, value of the data output. This may be used, e.g., for ambient colour enhancement of a displayed image. In an embodiment, the metadata comprises a single, global average, e.g. colour, value (e.g. RGB or YUV values) for the data output. Such metadata can be used to control, for example, tone strength via a global or local tone mapping algorithm in a display processor, and/or used to detect changes in a video stream, for example.

In an embodiment the data output comprises a YUV frame (e.g. as produced by a video processor), and the metadata that is generated for that YUV frame comprises one or more of, and in an embodiment all of: average YUV values for the frame; and a low-resolution luminance layer derived from the full resolution YUV frame. Such metadata may be used, for example, by a display processor for scene change detection and scene-aware colour management and tone mapping.

In an embodiment, the metadata may be one or more of, and in an embodiment plural of, and in an embodiment all of information indicative of: noise levels in the data output; gradients in the data output; and edges (edge sharpness) in the data output. This information could then be used for, for example, content-aware scene-dependent scaling and image enhancement in a display processor, for example.

In an embodiment, the metadata comprises motion vectors, e.g. provided by an image signal processor or video processor. Such metadata could then be used for, e.g., frame rate conversion (resampling) as well as digital image stabilisation tasks.

In an embodiment, the metadata is indicative of (relative) motion of one or more features, e.g. objects, in the data output. For example, the producer processing unit may be a hardware accelerator and generate metadata indicative of a set of features in the data output and their relative motion for use in an optical flow system SLAM.

In an embodiment, the metadata is a depth map, e.g., that is generated based on data outputs from a stereo camera system.

In an embodiment, the metadata is a downscaling ratio for the data output. This can then be used, e.g., in the consumer processing unit to select a (desired, e.g. the best) scaling method to use.

It would be possible to generate a single type of metadata, or plural different types of metadata for a data output, as desired.

The metadata may be generated for and from the data output in question and in any suitable and desired manner. This may be done, e.g., using normal techniques for generating such metadata, and may depend, e.g., and in an embodiment, upon the nature of the data output in question and/or of the metadata that is required.

A consumer processing unit can use the metadata associated with a data output when processing the data output in any suitable and desired manner. This may, e.g., and in an embodiment does, depend upon the nature of the consumer processing unit and/or of the data output and/or of the metadata in question.

In an embodiment, a (and the) consumer processing unit uses the metadata to control one or more embodiments of its processing of the data output. For example, and in an embodiment, a consumer processing unit may use the metadata for a data output to set or select one or more control parameters to use when processing the data output.

In an embodiment, the consumer processing unit is a display processor, and the display processor uses the metadata for (and to control) one or more of, and in an embodiment plural of, and in an embodiment all of: image enhancement; scene change detection; scene(content)-aware colour management; scaling; and tone mapping.

In an embodiment, the data output that is being generated comprises a YUV frame, the metadata that is produced for the YUV frame by the producer processing unit comprises average YUV values for the frame and a low resolution luminance layer derived from the full resolution YUV frame, and the consumer processing unit is a display processor and uses the metadata for one or more of scene change detection, scene aware colour management and tone mapping.

In this case, the low resolution luminance layer is in an embodiment used by the tone mapping process of the display processor to determine the intensity variation in the data output and to, accordingly, set the tone mapping parameters accordingly. This can then allow, for example, the display processor to make more intelligent decisions about tone mapping strength, thereby resulting in better user experience and better image quality of the final display processor output.

In an embodiment, the metadata comprises a single global average colour value (e.g. RGB or YUV value) associated with the data output, and the consumer processing unit is a display processor that then uses that global average colour value to control, e.g. tune the strength of, a global and/or local tone mapping process that is being performed in the display processor.

In this case, the global average colour values could also be used to detect scene changes in a sequence of data outputs (e.g. in a video stream) and correspondingly may be used to control the strength of the tone mapping that is being applied to the sequence of frames.

In an embodiment, the metadata comprises information about noise levels, gradients and/or edge sharpness in respective regions of the data output, and the consumer processing unit is a display processor which uses that information to control (e.g. set parameters for) one or more of a scaling process and an image enhancement process in the display processor. In this case, the metadata could be used for content aware, scene-dependent scaling and image enhancement in the display processor.

In an embodiment, the consumer processing unit is a video processor, and the video processor uses the metadata generated for the data output to control its encoding process (e.g., and in an embodiment, to set and select parameters of the encoding process). In this case, as discussed above, the metadata is in an embodiment indicative of changes in the data output relative to a previous (and in an embodiment the immediately preceding) data output. This would then allow the video processor to use the metadata to assess the complexity of the data output that is being encoded when using a differential encoding process, for example, by, for example, determining from the metadata the size of any motion or data differences in the current frame and in which parts of the frame those differences occur (are present).

Thus, in an embodiment, the producer processing unit is producing a sequence of frames (images) for video encoding, and generates for each data output in the sequence, metadata indicative of any changes (differences) relative to the preceding data output (frame) in the sequence, and the consumer processing unit is a video processor that is encoding the sequence of data outputs (frames) being generated, and uses the difference-indicating metadata for the data outputs to control the encoding process.

In this case, the metadata could also or instead describe object motion (e.g. either dense or sparse) from data output to data output (frame-to-frame) in the sequence, with the consumer processing unit then, e.g., and in an embodiment, performing processing such as guided encoding and/or digital image stabilisation, using and/or based on the object motion describing metadata.

In an embodiment, the producer processing unit generates as metadata, a depth map (depth information) for the data output in question. This could be used, e.g., in a computer vision engine to assist a classification operation.

The metadata that a producer processing unit generates for a data output can be provided for and conveyed to (propagated to) a consumer processing unit or units in any suitable and desired manner.

In an embodiment, the metadata is stored in memory by the producer processing unit, e.g., and in an embodiment, in association with the data output itself (and accordingly, in an embodiment, in the same memory as the data output is stored), from where it can be read by the consumer processing unit when and while the consumer processing unit is reading the data output.

In this case, the metadata is in an embodiment stored in the memory by a producer processing unit, and read from the memory by a consumer processing unit, via appropriate hardware memory interfaces (i.e. without any software involvement), such as, and in an embodiment, by appropriate direct memory access (DMA) operation by the producer and consumer processing units.

In this case therefore, the metadata may be conveyed to the consumer processing unit using (in an embodiment existing) system (hardware) memory interfaces.

Thus, in an embodiment, the metadata for a data output is stored in memory by the producer processing unit, and read from memory by a consumer processing unit, using hardware (memory) interfaces (communication).

Correspondingly, in an embodiment, the metadata for a data output is provided for and conveyed to the consumer processing unit using hardware communications interfaces (is propagated from the producer processing unit to a (the) consumer processing unit using (via) a hardware communication path), in an embodiment by storing the metadata in appropriate memory of the media processing system.

In an embodiment, the metadata is provided for and conveyed to a consumer processing unit using software (communication) interfaces (is propagated from the producer processing unit to a (the) consumer processing unit using (via) a software communication path).

In this case, the metadata generated by the producer processing unit is in an embodiment packed into a software metadata structure (e.g., and in an embodiment, by the driver for the producer processing unit), and then passed, e.g. with other software structures, such as the data output buffer (e.g. frame buffer) memory pointers, indicating the location of the data output, to a software process of the consumer processing unit (e.g. and in an embodiment to the driver for the consumer processing unit), with the software process (e.g. driver) for the consumer processing unit then accessing the metadata and passing it to the consumer processing unit hardware appropriately.

In an embodiment, the consumer processing unit is a display processor, and the display processor comprises a display processing component (unit) that performs composition and display processing, and a pixel processor that is in communication with the display processing unit and that performs pixel processing operations, such as tone mapping.

In this case, in an embodiment, there is a hardware communications interface (path) between the display processor component (e.g. the display processing unit) that performs the composition and display processing, and the pixel processor that performs the pixel processing operations, such as tone mapping, for providing the metadata for a data output to the pixel processor. In this case, the metadata generated by a producer processing unit is in an embodiment conveyed, e.g., and in an embodiment, via hardware interfaces (paths), to the display processing unit of the display processor, with that metadata then being conveyed via the hardware interface (path) between the display processing unit and the pixel processor to the pixel processor.

Other arrangements would, of course, be possible. For example, in the case where the metadata is conveyed from a producer processing unit to the display processor via a software communication path, then that software communication path could be used to convey the metadata to the pixel processor directly (i.e. not via the display processing unit first).

As will be appreciated from the above, the technology described herein is generally applicable to any and all producer and consumer processing units in a media processing system. In particular, it is envisaged in the technology described herein that any producer processing unit, such as an image signal processor, video processor, or a graphics processor, may be operable to generate metadata for a data output that it is producing. Furthermore, it is believed that the idea of an image signal processor or a video processor, at least, generating metadata for a data output that it is producing (whether for use in the manner of the technology described herein or otherwise) may be new and advantageous in its own right.

Thus, an embodiment of the technology described herein comprises a method of operating a video processor or an image signal processor of a media processing system, the method comprising:

the video processor or image signal processor, when producing a data output and storing the data output in memory:

also generating metadata for the data output that it is producing and storing in the memory; and providing that metadata for use by a processing unit that is to read the data output from the memory.

An embodiment of the technology described herein comprises a video processor or an image signal processor for use in a media processing system, the video processor or image signal processor being operable to:

produce data outputs for use by a consumer processing unit operable to use a data output produced by the video processor or image signal processor;

the video processor or image signal processor being further operable to, when producing a data output for use by a consumer processing unit or units and storing the data output in memory:

also generate metadata for the data output that it is producing and storing in the memory; and provide that metadata for use by a consumer processing unit that is to read the data output from the memory.

As will be appreciated by those skilled in the art, the technology described herein can, and in an embodiment does, include any one or more or all of the features of the embodiments of the technology described herein, as desired, and as appropriate.

Although the technology described herein has been described with particular reference to, and requires, the use when consuming a data output of metadata that has been generated from the data output that is being consumed, it would be possible to also use metadata generated from other data outputs (in addition to the metadata generated from the data output being processed), if desired (and in one embodiment, that is done, i.e. the consumer processing unit uses both the metadata generated for the data output by the producer processing unit, and metadata generated from another data output or outputs when processing a data output).

Although the technology described herein has been described above with particular reference to the processing of a given, single data output, as will be appreciated by those skilled in the art, in media processing systems, typically a given producer processing unit will be producing a sequence of data outputs, such as a sequence of frames for display. In that case, the technology described herein is in an embodiment carried out in respect of each and every data output (frame) in the sequence, and thus in an embodiment, the technology described herein comprises a producer processing unit producing a sequence of data outputs for use by a consumer processing unit or units, and also producing for and providing for each data output in the sequence, appropriate metadata (and in an embodiment metadata of the same type) for use by the consumer processing unit or units when processing that data output of the sequence (and potentially also when processing other data outputs of the sequence).

Thus, in an embodiment, a (and each) data output (e.g. frame) will have some associated metadata structure, that carries (stores) metadata about the data output, in addition to the actual data for the data output.

In an embodiment, metadata generation in the manner of the technology described herein can be selectively enabled (i.e. such that a producer processing unit can be triggered to produce metadata for data outputs that is producing or not). Correspondingly, a consumer processing unit can in an embodiment be selectively enabled to use metadata that a producer processing unit may have generated and provided for a data output. Such metadata production and use can be enabled (and disabled) in any desired and suitable manner.

Any one or more or all of the processing units of the technology described herein may be embodied as a processing unit circuit, e.g., in the form of one or more fixed-function units (hardware) (processing circuits), and/or in the form of a programmable processing circuit that can be programmed to perform the desired operation. Equally, any one or more or all of the processing units and processing unit circuits of the technology described herein may be provided as a separate circuit element to any one or more of the other processing units or processing unit circuits, and/or any one or more or all of the processing units and processing unit circuits may be at least partially formed of a shared processing circuit.

The processing units and/or media processing system described herein in any embodiment may comprise, or may be, or may form part of, a system on chip (SoC).

As well as the particular processing units, the media processing system of the technology described herein can otherwise include any suitable and desired elements, and units, etc, that a media processing system may include. Thus, in an embodiment, the media processing system further includes a host (e.g. central) processor. The host processor may, for example, execute applications that require data processing by the processing units of the media processing system. The host processor may send appropriate commands and data to the processing units to control them to perform the data processing operations and to generate and/or use a data output or outputs required by applications executing on the host processor. To facilitate this, the host processor may execute a driver or drivers for the processing units and/or may execute a compiler or compilers for compiling programs to be executed by a programmable execution unit(s) of the processing unit(s).

In embodiments, the processing unit(s) or system may comprise, and/or may be in communication with, one or more memories and/or memory devices that store the data described herein, and/or store software for performing the processes described herein. The processing unit(s) or system may comprise, and/or may be in communication with a display for displaying images based on the data outputs.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and units of the technology described herein may comprise a suitable processor or processors, controller or controllers, functional units, circuits, processing logic, microprocessor arrangements, etc., that are operable to perform the various steps or functions, etc., such as appropriately dedicated hardware elements (processing circuit) and/or programmable hardware elements (processing circuit that can be programmed to operate in the desired manner.

The various steps or functions, etc., of the technology described herein may be duplicated and/or carried out in parallel on a given processor. Equally, the various processing units, etc., may share processing circuits, etc., if desired. Subject to any hardware necessary to carry out the specific steps or functions, etc., discussed above, the system can otherwise include any one or more or all of the usual functional units, etc., that data processing systems include.

In an embodiment, the various functions of the technology described herein are carried out on a single data processing platform that generates and outputs the data streams(s) in question.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

The drawings show elements of a media processing system that are relevant to embodiments of the technology described herein. As will be appreciated by those skilled in the art there may be other elements of the media processing system that are not illustrated in the drawings. It should also be noted here that the drawings are only schematic, and that, for example, in practice the shown elements may share significant hardware circuits, even though they are shown schematically as separate elements in the drawings.

As discussed above, the technology described herein and the present embodiments relate to the production and consumption of data outputs, such as frames, in media processing systems, e.g. of the type shown in FIG. 1.

Figure 2:
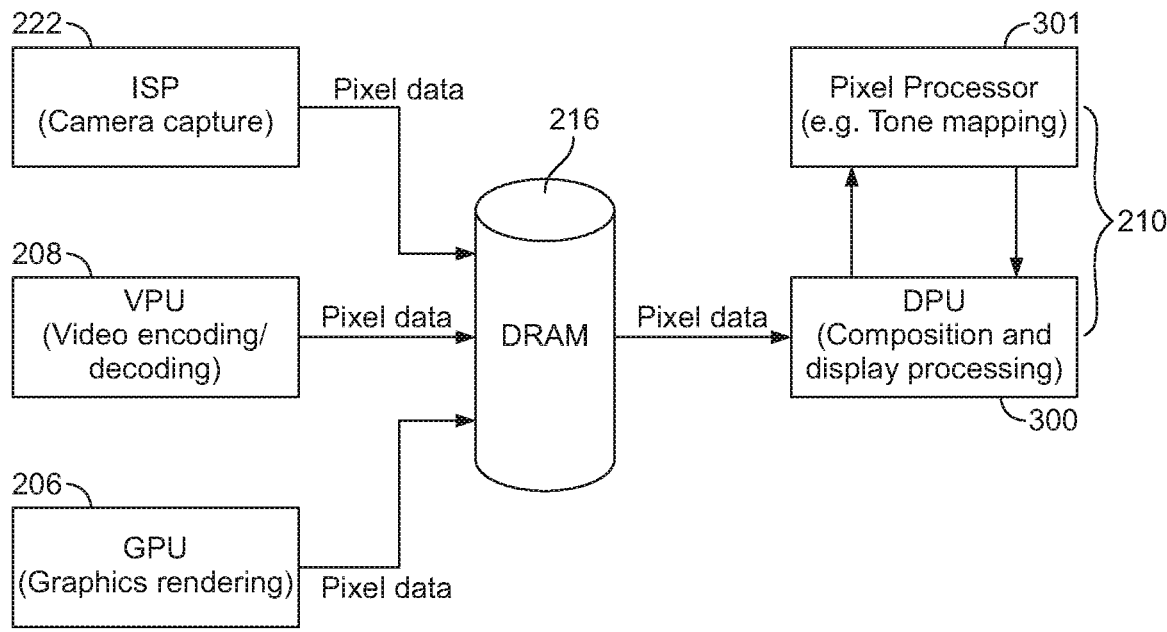
FIG. 2 shows schematically exemplary operation of producer and consumer processing units in a media processing system as shown in FIG. 1.

FIG. 2 shows schematically exemplary data flows between producing and consuming processing units in a media processing system such as that shown in FIG. 1.

As shown in FIG. 2, the image signal processor (ISP) 222, which, for example, provides high-quality camera capture and post-processing pipeline, may store pixel data of images (frames) captured by the camera 220 in the memory 216.

Similarly, the graphics processing unit (GPU) 206 may render graphics layers (frame buffers) which are to be composited into a display, and accordingly will produce those graphics layers as data outputs that it stores in the memory 216.

Similarly, the video processing unit (VPU) 208 will be responsible for real-time decoding of a video bit stream, and real-time encoding of a pixel stream, e.g. from the camera 220 (which can also include still image compression), and store the decoded or encoded data output appropriately to the memory 216.

Correspondingly, the display processor 210 will act as a consumer processing unit that is able to "consume" (use) data outputs stored in the memory 216 by the producer processing units, such as the ISP 222, the VPU 208 and the GPU 206.

FIG. 2 shows the display processor 210 as comprising a display processing unit (DPU) 300 that is, e.g., responsible for real-time composition of display layers (e.g. generated by the VPU and ISP), and pre-processing of those layers before composition, as well as post-processing after composition. The display processor 210 is also shown as including a pixel processor 301, which in the present embodiments is closely integrated with the display processing unit 300, and performs display processing functions, such as tone mapping.

As will be appreciated by those skilled in the art, there can be other components, such as other modules and hardware accelerators, in a multi-media system, so the system may include other processing units in addition to those shown in FIG. 2.

In a multi-media processing system such as illustrated in FIGS. 1 and 2, the graphics processor 206, video processor 208 and image signal processor 222 will, as discussed above, generate and write pixel data for data outputs that they are producing to appropriate frame buffers in the (DRAM) memory 216. This pixel data can be stored in various formats, including RGB and YUV colour spaces, and use different bit precision per pixel component.

The display processor 210, for example, will then read and interpret each of the frame buffer formats and present it correctly to the final display output for display on the display device 218. This operation may include compositing plural different layers produced by the ISP 222, VPU 208 and/or GPU 206, and also performing image enhancement and other display processing operations, such as tone mapping, on the frames (e.g. after composition) before they are displayed.

In the present embodiments, the operation illustrated in FIG. 2 is enhanced by a producer processing unit such as the ISP 222, VPU 208 or GPU 206, when it is producing a data output for consumption by a consumer processing unit such as the display processor 210, also generating metadata for the data output and providing that metadata for use by the consumer processing unit when the consumer processing unit is processing the data output (to which the metadata relates).

For example, in the case of a video playback scenario, in which the video processing unit 208 is generating a sequence of (YUV) video frames for playback (display) by the display processor 210, the VPU 208 could generate with each decoded video frame metadata in the form of an average YUV value for the frame, and a low resolution luminance layer version of the full resolution YUV frame. This metadata would then be propagated to the display processor 210, which could then use that metadata for, for example, scene change detection, and/or scene-aware colour management and tone mapping, image scaling and enhancement. Because the metadata is provided with the frame to which it relates, the display processor is able to make more intelligent decisions about image enhancement, tone mapping strength, etc., thereby providing a better user experience and better image quality of the final display processor output.

Figure 3:
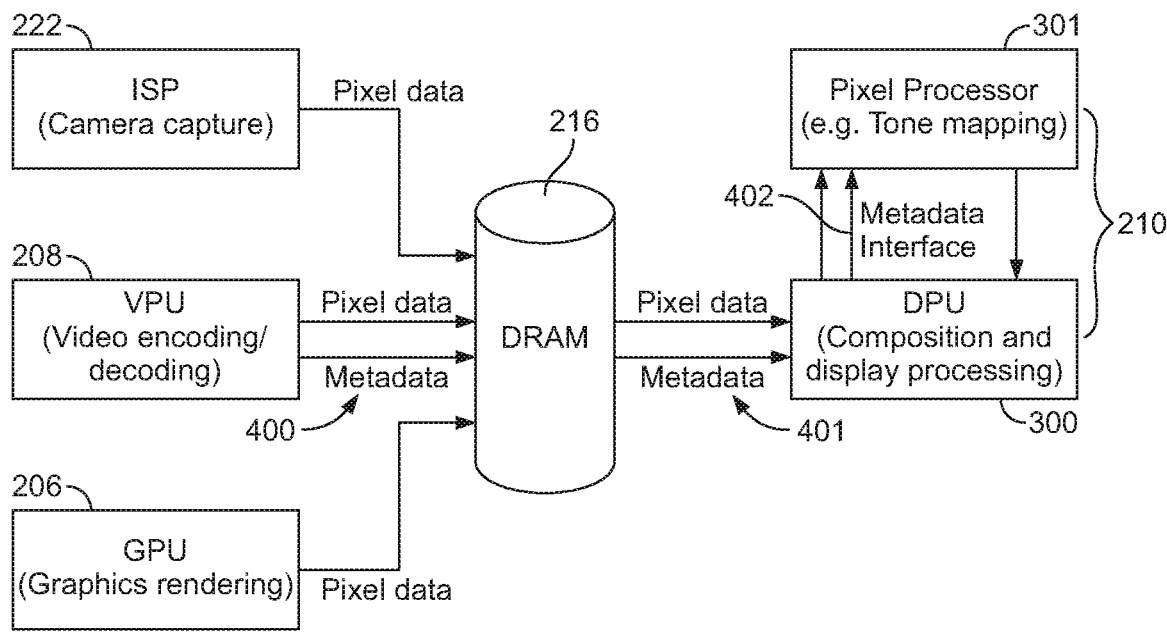
FIG. 3 shows schematically operation of producer and consumer processing units in a media processing system in an embodiment of the technology described herein.

FIG. 3 illustrates this, and shows schematically a similar arrangement to that shown in FIG. 2, but with the addition of the generating and conveying of metadata from the VPU 208 that is producing frames for consumption by the display processor 210 for display.

In the arrangement shown in FIG. 3, the metadata generated by the video processing unit 208 is conveyed to the display processor 210 via hardware communication interfaces, namely by the video processor 208 writing 400 the metadata for a frame to the memory 216, with the display processor 210 then reading 401 the metadata from the memory 216 using a hardware interface (such as AXI (but other arrangements would, of course, be possible)) for use when processing the frame generated by the VPU 208. In this case therefore, the metadata is written into the memory 216 by the producer processing unit in association with the data output (frame buffer) pixel data, using a hardware interface, and then fetched by the consuming display processor 210 again using, e.g., existing, hardware system and memory interfaces.

FIG. 3 also shows a metadata hardware interface 402 between the display processing unit 300 and the pixel processor 301 of the display processor 210 to propagate the metadata read from the memory 216 directly to the pixel processing engine, such as the tone mapper.

Although FIG. 3 shows the propagation of the metadata using hardware interfaces (via the memory 216), the metadata can also be propagated using software interfaces, if desired.

Figure 4:
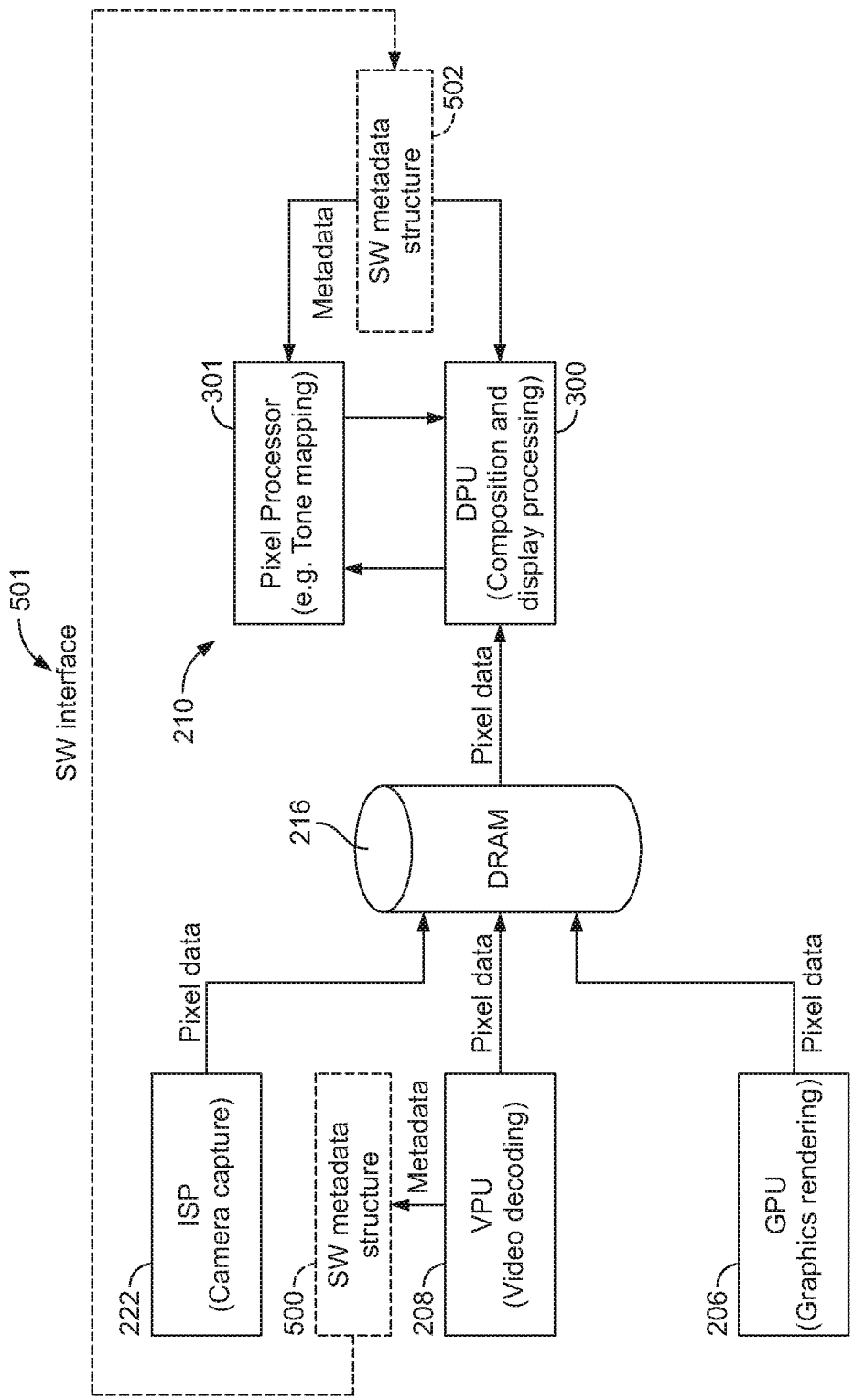
FIG. 4 shows schematically operation of producer and consumer processing units in a media processing system in an embodiment of the technology described herein.

FIG. 4 illustrates this, and shows that the metadata generated by the VPU 208 may be packed into a software metadata structure 500 that is then passed 501 via a software interface (e.g. along with the data output frame buffer memory pointers) to 502 the software driver of the consuming display processor 210, to be then passed to the display processor 210 hardware and used during processing. (In this arrangement, as shown in FIG. 4, the actual data outputs (the pixel data) is still stored in the memory 216 for use by the consumer consuming display processor 210 via appropriate hardware memory interfaces.)

In the examples shown in FIGS. 3 and 4, the video processor 208 is acting as a producer processing unit producing frames of video data for processing and display by the display processor 210. In this case, the metadata that is generated by the video processor 208 for each YUV video frame may be, for example, a low-resolution ("thumbnail") luminance layer generated from the full resolution decoded YUV video frame, which can then be used to control the tone mapping processing done by the display processor 210.

Tone mappers typically operate based on analysis of the pixel data for a frame, in order to derive information about intensity, contrast, white level and other characteristics of the processed video frame, which is then applied during processing. By providing metadata such as a luminance thumbnail layer for a video frame, the tone mapper is, in the present embodiments, able to more quickly analyse the scene intensity variation using the thumbnail layer, and in the same display frame when the actual processing is being performed (because the low resolution thumbnail layer can be fetched by the display processing unit 300 and provided to the tone mapper 301 in the short time during the vertical blanking time of the display frame). This then allows the tone mapping processing to be performed and controlled based on the luminance thumbnail layer for the video frame itself (rather than, e.g., being based on luminance data or analysis of a previous video frame). This can therefore provide an enhanced tone mapping operation.

Figure 5:
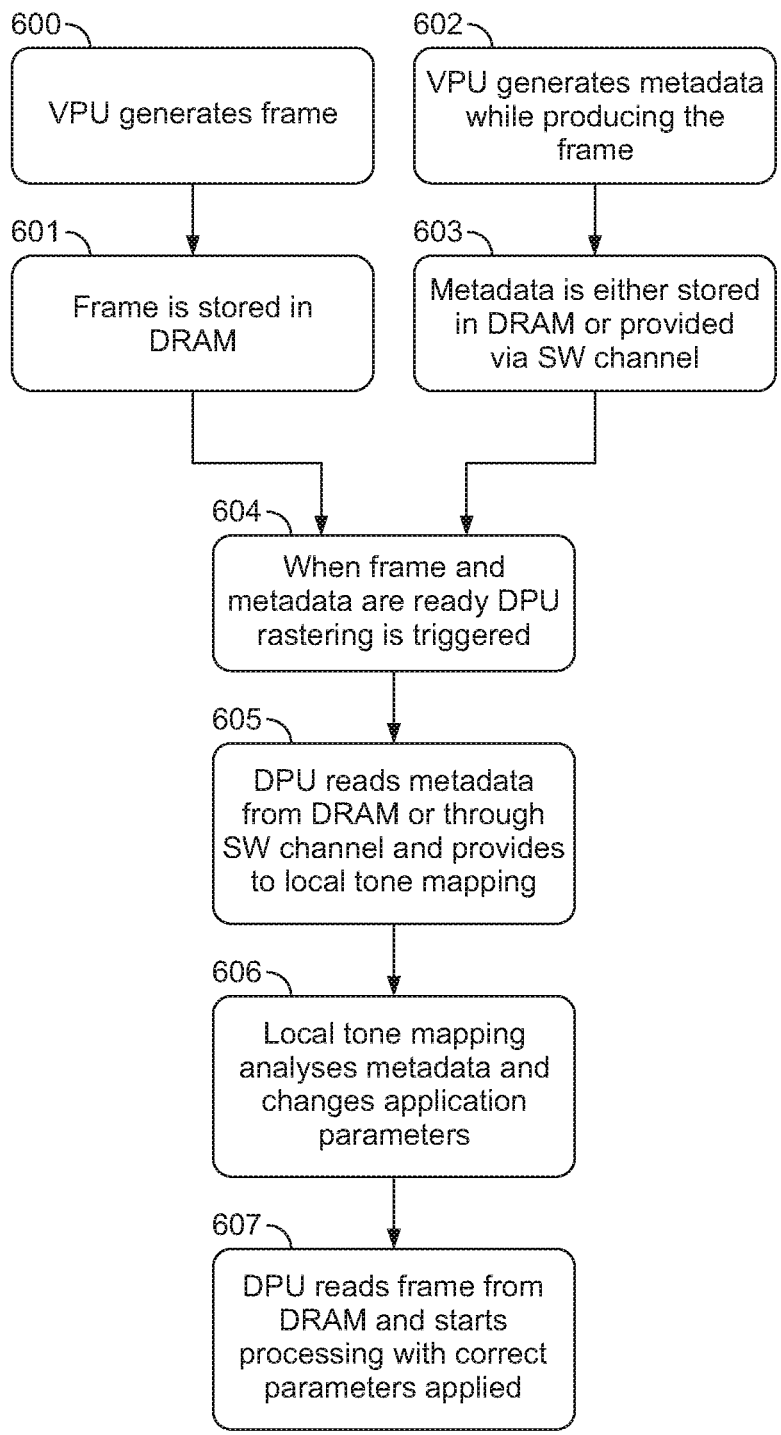
FIG. 5 shows the operation of producer and consumer processing units in an embodiment of the technology described herein.

FIG. 5 illustrates this, and shows the video processor generating a video frame (step 600) and storing the video frame in the memory 216 (step 601), and at the same time generating the low resolution luminance layer metadata (step 602) and storing that metadata in the memory 216 or otherwise providing it via a software channel (step 603).

Then, when the video frame and the metadata are ready, processing of the video frame by the display processor 210 is triggered (step 604). The display processing unit 300 of the display processor 210 accordingly reads the metadata from the memory 216 or through the software channel, and provides it to the local tone mapping processor in the pixel processor 301 (step 605). The local tone mapping operation analyses the low resolution luminance layer metadata and sets the tone mapping application parameters accordingly (step 606).

The display processing unit 300 of the display processor 210 then reads the video frame from the memory 216 and starts processing that frame using the tone mapping parameters determined from the metadata generated for the frame (step 607).

This is then repeated for the next video frame in the sequence, and so on.

In these arrangements, the low resolution luminance layer metadata could also be used in other ways, for example, for scene change detection and attenuation control of the local tone mapper strength (e.g. if the image statistics generation and application cannot be performed in the same frame for any reason).

It would also be possible to generate and use other or additional metadata. For example, a single global average RGB or YUV value could be generated for each video or graphics layer, which could then be used to control and tune the strength of the global or local tone mapping in the display processor, for example. Global average RGB/YUV values could also be used to detect scene changes in a video stream, for example.

Other metadata, e.g. generated on ISP or VPU side, such as information about noise levels, gradients or edge sharpness in various areas of the image could also be generated and used to control other processes in the display processor, for example, such as scaling and image enhancement. For example, metadata information about noise level, gradient or edge sharpness in various areas of an image could be used for content-aware, scene-dependent scaling and image enhancement in the display processor 210.

Also, although FIGS. 3 and 4 show the video processor 208 being the producer processing unit that is generating the metadata and the display processor 210 as consuming the frames produced by the video processing unit (and using the metadata), other processing units in the media processing system could act as producing and consuming the processor units, as desired.

Thus metadata can be produced by all producer processing units in the system, such as the GPU, VPU, ISP or other producer processing units, and other processing units, as well as the display processor 210, can act as consumer processing units that use the metadata.

For example, the graphics processor 206 may be operable to perform composition of display layers, and so could accordingly consume and use metadata for display layers that it is compositing.

Correspondingly, the image signal processor 222 could act as a producer processing unit producing frames from the camera 220 for encoding by the video processor 208 (which will then be acting as the consumer processing unit). In this case therefore, the image signal processor 222 will produce a sequence of frames together with associated metadata, which the video processor will then encode, using the metadata to control an aspect or aspects of the encoding process.

In this case, the metadata that is generated by the image signal processor for each frame to be encoded in an embodiment comprises metadata that is indicative of the complexity of the frame, such as, and in an embodiment, metadata (e.g. differential data or thumbnails) that is indicative of the change between successive frames that are to be encoded. In this case, an indication of the changes between successive frames will be produced as metadata by the ISP 222 and provided to the video processor 208, with the video processor then using that metadata to assess the complexity of the frame to be encoded (e.g. how big the motion or data differences between the frames, and in which part of the frame it occurs, is), and then use that information to set its encoding parameters accordingly.

Figure 6:
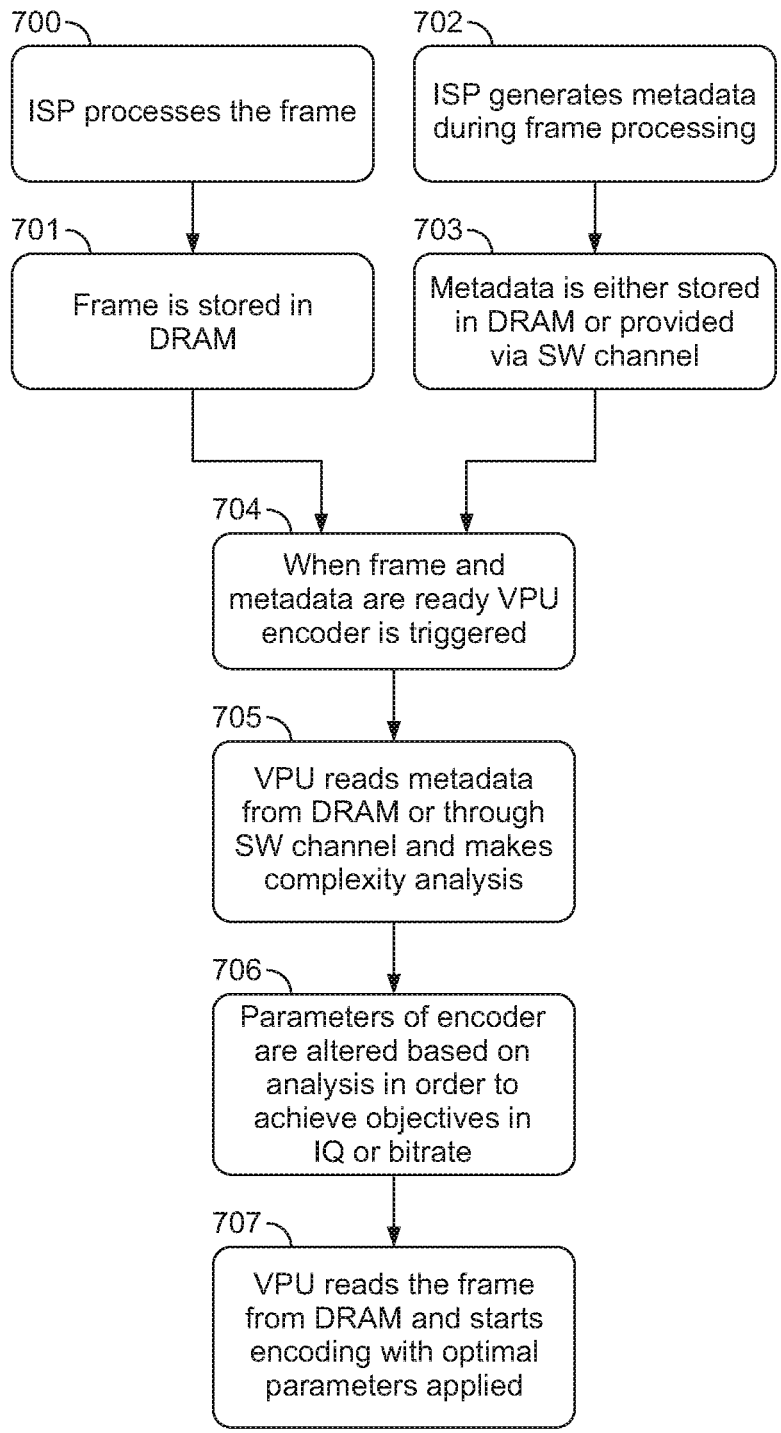
FIG. 6 shows the operation of producer and consumer processing units in an embodiment of the technology described herein.

FIG. 6 illustrates this and shows the image signal processor producing a frame (step 700) and storing that frame in the memory 216 (step 701), and at the same time generating appropriate metadata during the frame processing (step 702) and either storing that metadata in the memory 216 or providing it via a software channel for use by the video processor (step 703).

Then, when the frame and metadata are ready, the video processor encoder is triggered (step 704), and the video processor reads the metadata from the memory or through the software channel and performs a complexity analysis based on the metadata (step 705).

The video encoder then alters its encoding parameters based on the complexity analysis, e.g., and in an embodiment, in order to achieve desired objectives, such as relating to image quality and/or bit rate (step 706), and reads the frame for encoding from the memory 216 and starts encoding the frame using the selected encoding parameters (step 707).

This is then repeated for the next frame in the sequence, and so on.

Other arrangements would, of course, be possible.

It will be seen from the above that the technology described herein, in embodiments, provides a mechanism for improved processing of data outputs in a media processing system.

This is achieved, in embodiments of the technology described herein, by the producer processing unit (such as a VPU, GPU, ISP or other producer in the media processing system) also generating "in-band" metadata for a (and each) data output (e.g. frame buffer) that it produces, which metadata is generated and then passed together with the actual data output (frame buffer) pixel data to the consumer processing unit, such as a display processor. The consumer processing unit then uses the "in-band" metadata to assist its processing of the pixel data of the associated data output (frame buffer), for example to perform content-aware image scaling and enhancement, or for scene-dependent global or local tone mapping. This can provide better, high-quality processing of the data output (frame buffer) that in the case where the metadata is not provided or used.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a media processing system that comprises:
   one or more producer processing circuits;
   a consumer processing circuit comprising a display processor; and
   a memory;
   the method comprising:
   a producer processing circuit of the one or more producer processing circuits producing a data output and storing the data output in the memory, wherein the data output comprises one or more video frames, and wherein the storing the data output comprises storing the one or more video frames in a frame buffer comprising an allocated region of the memory; and the display processor reading the data output from the allocated region of the memory corresponding to the frame buffer and processing the read data output;

the method further comprising:

the producer processing circuit:

also generating metadata for the data output that it is producing and storing in the memory, wherein generating the metadata comprises deriving the metadata from the one or more video frames of the data output, the metadata allowing video or image processing operations of the one or more video frames by the display processor; and providing said metadata derived from the one or more video frames of the data output for use by the display processor that is reading the one or more video frames of the data output from the allocated region of the memory corresponding to the frame buffer; and the display processor that is reading the data output comprising the one or more video frames from the allocated region of the memory corresponding to the frame buffer and processing the read data output:

when processing the read data output comprising the one or more video frames from the allocated region of the memory corresponding to the frame buffer, using the metadata derived from the data output generated and provided by the producer processing circuit for video or image processing operations of the one or more video frames comprising one or more of: scene-aware colour management and tone mapping.

2. The method of claim 1, wherein the metadata derived from the one or more video frames of the data output generated by the producer processing circuit represents and/or is indicative of an absolute characteristic or characteristics of the one or more video frames of the data output.

3. The method of claim 1, wherein the metadata derived from the one or more video frames of the data output generated by the producer processing circuit is indicative of whether and/or how the data output for which the metadata is being generated has changed and/or differs from another, different data output.

4. The method of any claim 1, wherein the display processor, is further configured to use the metadata for one or more of: image enhancement; scene change detection; and scaling.

5. The method of claim 1, wherein:

the data output that is being generated by the producer processing circuit comprises a YUV frame;

the metadata that is produced for the YUV frame comprises average YUV values for the frame and a low resolution luminance layer derived by the producer processing circuit from the full resolution YUV frame generated by the producer processing circuit.

6. The method of claim 1, wherein:

the metadata derived from the one or more video frames of the data output generated by the producer processing circuit comprises information about noise levels, gradients and/or edge sharpness in respective regions of the data output; and the display processor uses that metadata to control one or more of: a scaling process and an image enhancement process in the display processor.

7. The method of claim 1, wherein:

the display processor comprises a display processing circuit that performs composition and display processing, and a pixel processor that is in communication with the display processing circuit and that performs pixel processing operations; and there is a hardware communications path for conveying the metadata between the display processing circuit and the pixel processor.

8. A method of operating a video processor or an image signal processor of a media processing system, the method comprising:

the video processor or image signal processor, when producing a data output and storing the data output in memory, wherein the data output comprises one or more video frames, and wherein the storing the data output comprises storing the one or more video frames in a frame buffer comprising an allocated region of the memory:

also generating metadata for the data output that it is producing and storing in the region of memory corresponding to the frame buffer, wherein generating the metadata comprises deriving the metadata from the one or more video frames of the data output, the metadata allowing video or image processing operations of the one or more video frames by a consumer processing circuit which is a display processor that is to read the one or more video frames of the data output from the allocated region of the memory corresponding to the frame buffer; and providing said metadata derived from the one or more video frames of the data output for use by the the display processor that is to read the one or more video frames of the data output from the allocated region of the memory corresponding to the frame buffer, wherein the display processor is to use the metadata for video or image processing operations of the one or more video frames comprising one or more of: scene-aware colour management and tone mapping.

9. A media processing system comprising:

a producer processing circuit;

a consumer processing circuit comprising a display processor; and a memory;

wherein:

the producer processing circuit is configured to, when producing a data output for use by the display processor and storing the data output in the memory, wherein the data output comprises one or more video frames, and wherein the storing the data output comprises storing the one or more video frames in a frame buffer comprising an allocated region of the memory:

also generate metadata for the data output that it is producing and storing in the allocated region of the memory corresponding to the frame buffer, wherein generating the metadata comprises deriving the metadata from the one or more video frames of the data output; and provide said metadata derived from the one or more video frames of the data output for use by the display processor that is reading the one or more video frames of the data output from the allocated region of the memory corresponding to the frame buffer, the metadata allowing video or image processing operations of the one or more video frames by the display processor; and the display processor is configured to, when it is reading a data output comprising the one or more video frames produced by the producer processing circuit from the allocated region of the memory corresponding to the frame buffer and processing the read data output:

when processing the read data output from the allocated region of the memory corresponding to the frame buffer comprising the one or more video frames, use the metadata derived from the data output generated and provided by the producer processing circuit for video or image processing operations of the one or more video frames comprising one or more of: scene aware colour management and tone mapping.

10. The system of claim 9, wherein the producer processing circuit is one of: a video processor, a graphics processor, and an image signal processor (ISP).

11. The system of claim 9, whereincomprising:
the display processor is further configured to use metadata provided for a data output for one or more of: image enhancement; scene change detection and scaling.

12. The system of claim 9, wherein:
the producer processing circuit is configured to:
generate a YUV frame as a data output;
and to produce as metadata for the YUV frame, average YUV values for the frame and a low resolution luminance layer derived from the full resolution YUV frame; and
wherein the display processor is configured to use average YUV values and a low resolution luminance layer metadata provided for a YUV frame for the one or more of: scene aware colour management, and tone mapping.

13. The system of claim 9, wherein:
the metadata derived from the one or more video frames of the data output generated by the producer processing circuit comprises information about noise levels, gradients and/or edge sharpness in respective regions of the data output; and
the display processor is configured to use metadata comprising information about noise levels, gradients and/or edge sharpness in respective regions of a data output to control one or more of: a scaling process and an image enhancement process in the display processor.

14. The system of claim 9, comprising a hardware communication path for propagating the metadata for a data output from the producer processing circuit to a consumer processing circuit.

15. The system of claim 9, comprising a software communication path for propagating the metadata for a data output from the producer processing circuit to a consumer processing circuit.

16. The system of claim 9, wherein
the display processor comprises:
a display processing circuit that performs composition and display processing, and a pixel processor that is in communication with the display processing circuit and that performs pixel processing operations; and
a hardware communications path for conveying metadata between the display processing circuit and the pixel processor.

17. A non-transitory computer readable storage medium storing comprising computer software code which when executing on a processor performs a method of operating a media processing system, the media processing system comprising:
one or more producer processing circuits;
a consumer processing circuit comprising a display processor; and
a memory;
the method comprising:
a producer processing circuit of the one or more producer processing circuits producing a data output and storing the data output in the memory, wherein the data output comprises one or more video frames, and wherein the storing the data output comprises storing the one or more video frames in a frame buffer comprising an allocated region of the memory; and
the display processor reading the data output from the allocated region of the memory corresponding to the frame buffer and processing the read data output;
the method further comprising:
the producer processing circuit:
also generating metadata for the data output that it is producing and storing in the memory, wherein generating the metadata comprises deriving the metadata from the one or more video frames of the data output, the metadata allowing video or image processing operations of the one or more video frames by the display processor; and
providing said metadata derived from the one or more video frames of the data output for use by the display processor that is reading the one or more video frames of the data output from the allocated region of the memory corresponding to the frame buffer; and
the display processor that is reading the data output comprising the one or more video frames from the allocated region of the memory corresponding to the frame buffer and processing the read data output:
when processing the read data output comprising the one or more video frames from the allocated region of the memory corresponding to the frame buffer, using the metadata derived from the data output generated and provided by the producer processing for video or image processing operations of the one or more video frames comprising one or more of: scene-aware colour management and tone mapping.

* * * * *

UNITED STATES PATENT AND TRADEMARK OFFICE
CERTIFICATE OF CORRECTION

PATENT NO. : 11,616,937 B2
APPLICATION NO. : 16/410560
DATED : March 28, 2023
INVENTOR(S) : Damian Piotr Modrzyk et al.

It is certified that error appears in the above-identified patent and that said Letters Patent is hereby corrected as shown below:

In the Claims

Column 19, Line 47 (Claim 4, Line 1), please replace "of any" with -- of --

Column 20, Line 32 (Claim 8, Line 23), please replace "the the" with -- the --

Column 21, Line 21 (Claim 11, Line 1), please replace "whereincomprising" with -- wherein --

Column 22, Line 11 (Claim 17, Line 2), please replace "storing comprising computer" with -- storing computer --

Signed and Sealed this
Twenty-third Day of May, 2023

Katherine Kelly Vidal
*Director of the United States Patent and Trademark Office*